P. F. BELLEW.
TIRE TOOL.
APPLICATION FILED JULY 27, 1909.
965,858.
Patented Aug. 2, 1910.
2 SHEETS—SHEET 2.
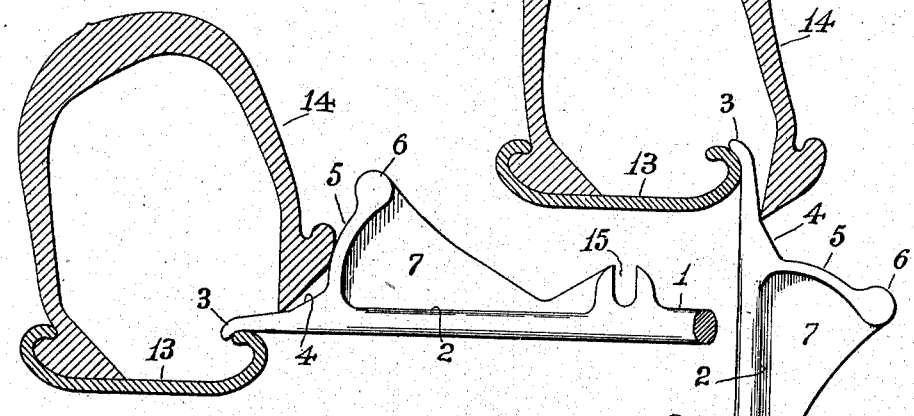
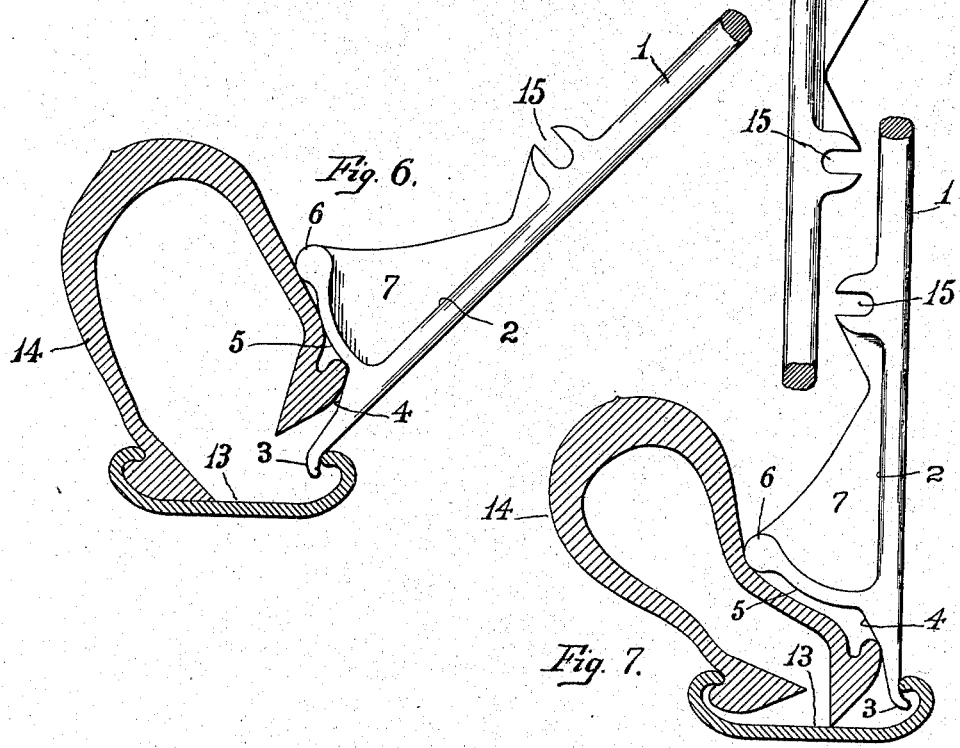
WITNESSES:
INVENTOR
Peter F. Bellew,
BY 
ATTORNEY

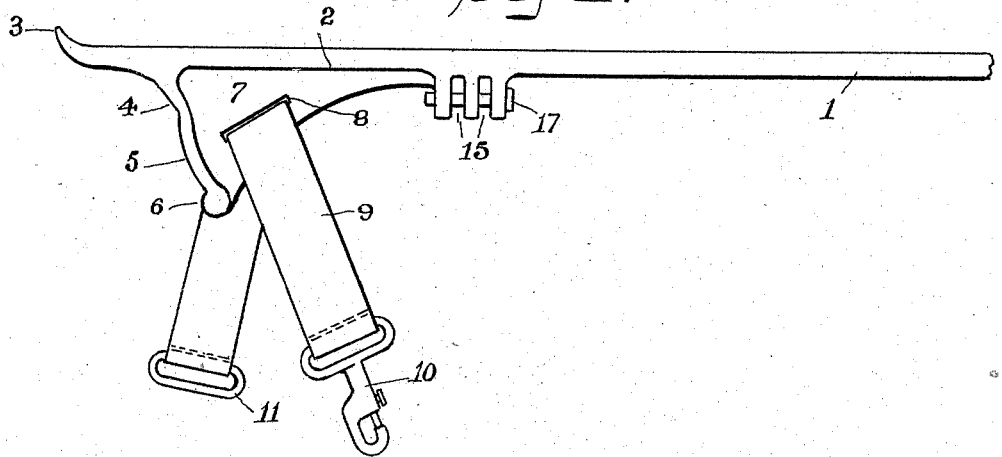
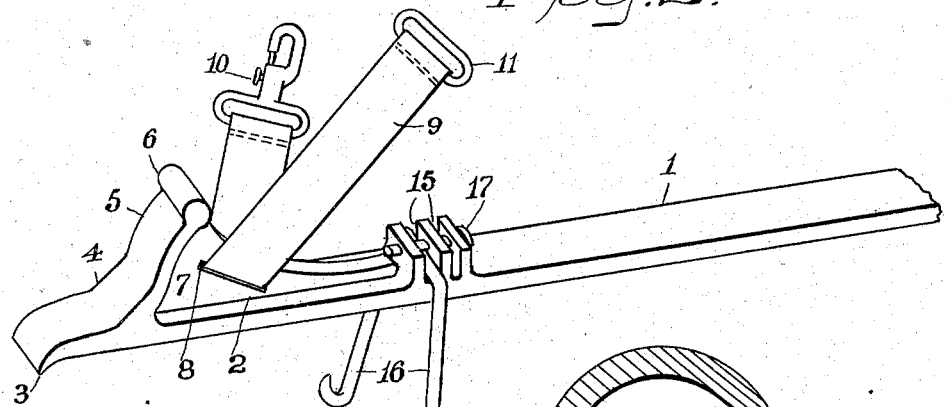
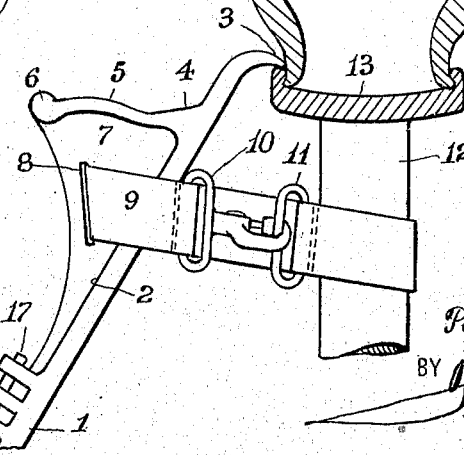

UNITED STATES PATENT OFFICE.

PETER F. BELLEW, OF BRIDGEPORT, CONNECTICUT.

TIRE-TOOL.

965,858. Specification of Letters Patent. Patented Aug. 2, 1910.

Application filed July 27, 1909. Serial No. 509,872.

*To all whom it may concern:*

Be it known that I, PETER F. BELLEW, a citizen of the United States, residing at Bridgeport, in the county of Fairfield and State of Connecticut, have invented certain new and useful Improvements in Tire-Tools; and I do hereby declare the following to be a full, clear, and exact description of the invention, such as will enable others skilled in the art to which it appertains to make and use the same.

My invention relates to irons for removing and putting on pneumatic tires, and has for its object to provide a device of this description which may be utilized, without the aid of other devices, for the purpose of performing substantially all of the operations necessary in the detaching of the shoes of a tire for the purpose of removing the inner tube and lugs, and also for the purpose of restoring the shoe in place after an inner tube has been inserted therein, a further object of my invention being to provide a tool which will render these operations just noted very easy of performance.

With these ends in view my invention consists in the combination and arrangement of parts hereinafter fully set forth and then particularly pointed out in the claims which conclude this description.

In the accompanying drawing Figure 1 is an elevation of my improved tire iron equipped with a spoke strap—Fig. 2 is a perspective view of my improvement equipped with a spoke strap and grappling jaw—Fig. 3 a broken elevation partly in section, illustrating the manner in which my improved iron is applied to a vehicle wheel for the purpose of loosening the shoe from the rim of said wheel, and Figs. 4, 5, 6, and 7, are elevations partly in section and illustrating in successive steps, the manner in which my improved iron is utilized in putting a shoe on the rim of a wheel.

Similar numerals of reference denote like parts in the several figures of the drawing.

I have illustrated no inner tubes since they cut no figure so far as the functions of my improvement are concerned.

1 is the handle of my improved tire iron and 2 the head thereof, the extreme forward end of the iron beyond the head terminating in a toe 3. This head 2 has a face which extends from the toe 3 rearwardly at a general incline, this face being composed of a substantially flat portion 4 adjacent to the toe 3, and convex portion 5 adjacent to the portion 4, said convex portion terminating at its outer end in an abrupt swell or heel 6. Thus it will be readily understood that the face of the toe, and the portions 4, 5, form one continuous face of the iron, while the swelled portion 6 affords an abutment whose functions will be presently explained. 7 is a web which connects the face of the iron with the main body portion and contributes greatly to the general strength of the iron as a whole. The head 2 is therefore made up of the parts 3, 4, 5, 6, and 7.

8 is a slot formed in the web 7 near its outer edge, and 9 is a strap of leather, webbing, or other soft material, which is passed through this slot and is provided at its extremities with a snap hook 10 and ring 11 whereby said strap may be attached around the spoke of the vehicle wheel.

In loosening a shoe which has become rusted or stuck to the rim of a wheel the strap 9 is secured around the spoke 12, and the toe 3 placed over the edge of the rim 13 against the shoe 14 as shown at Fig. 3, and by lifting the iron the toe is driven with great force against the shoe thereby releasing the same from the rim. But the efficiency of my iron is very pronounced in putting on a shoe, and I will now describe this operation, referring particularly to Figs. 4, 5, 6, and 7, of the drawing.

The iron is first placed with the toe against the rim 13 with the lower edge of the loose shoe resting upon the flat portion 4 of the face of my iron, as shown at Fig. 4; the iron is then lifted thus causing the edge of the shoe to be elevated while it is in contact with the flat portion 4, as shown at Fig. 5, the edge of the shoe being thus elevated above the rim 13, the handle of the iron at this point extending in a horizontal plane; the iron is then elevated to an angle of about 45°, as shown at Fig. 6, thus causing the convex portion 5 of the face of the iron to gradually roll the edge of the shoe inwardly so that said edge will overhang the rim 13, the swell 6 by this movement of the iron being brought into contact with the side of the shoe; finally, by elevating the iron to a perpendicular, the side of the shoe will be driven inwardly by the swell 6 and the edge of the shoe forced downwardly upon the rim, as shown at Fig. 7, whereupon the downward swinging of the iron to remove the same from contact with the rim will cause the shoe to spring into position within the rim. It will thus be seen that the convex portion 5 is a very important feature of my invention since it exerts an inwardly rolling effect against the edge of the shoe and puts the latter in proper position so that it can be finally driven home upon the wheel rim by the swell 6.

The operation of loosening a shoe may be effected without the use of the strap 9, although I prefer to employ the latter since the iron is thereby fulcrumed and held more steadily to its work and exerts a greater force against the shoe.

I have provided notches 15 on the upper face of the handle 1 at the base of the head for the purpose of accommodating a grappling jaw 16 which is placed within one of the notches and preferably held therein by means of a pin 17 extending through the walls of the notches above said jaw, and in utilizing my improvement equipped with this grappling jaw the under face of the iron is placed on top of the shoe and the prongs of the lever engaged with the edge of the shoe, whereupon by lifting the tire iron the shoe may be opened for the purpose of removing the lugs, or for any other obvious reasons.

The lever may be provided with a plurality of these notches 15 as shown at Figs. 1, 2, and 3, in order that the grappling jaw may be swung from different positions according to the demands of the occasion, or a single notch may be employed as shown at Figs. 4, 5, 6, and 7, but the number of notches used is immaterial and has nothing to do with my invention.

Having thus described my invention what I claim as new and desire to secure by Letters Patent is:—

1. A tire iron, comprising a handle, a head formed on the forward end of said handle and terminating in a toe, the face of said head rearwardly inclined and consisting of a substantially flat portion adjacent to said toe, a convex portion adjoining said flat portion, and a heel or bulging portion which terminates said convex portion.

2. A tire iron, comprising a handle, a head formed on the forward end of said handle and having an elongated slot and terminating in a toe, said head having an inclined face which is flat adjacent to said toe and thence is convex and terminates in a bulging portion, and a strap extending through the slot in said head and provided with fastening devices for securing the ends together.

3. In a tire iron, a handle having a notched portion, a head formed on the forward end of said handle and terminating in a toe, the face of said head rearwardly inclined and consisting of a flat portion adjacent to said toe, a convex portion adjoining said flat portion and terminating in a bulge, a grappling jaw adapted to be contained within said notched portion, and movable means for securing said jaw within said notched portion.

In testimony whereof I affix my signature in presence of two witnesses.

PETER F. BELLEW.

Witnesses:
F. W. SMITH, Jr.,
M. T. LONGDEN.